May 2, 1950     T. P. SIMPSON     2,506,552
METHOD OF REGENERATING SPENT CONTACT MASS MATERIAL
Filed Nov. 27, 1945
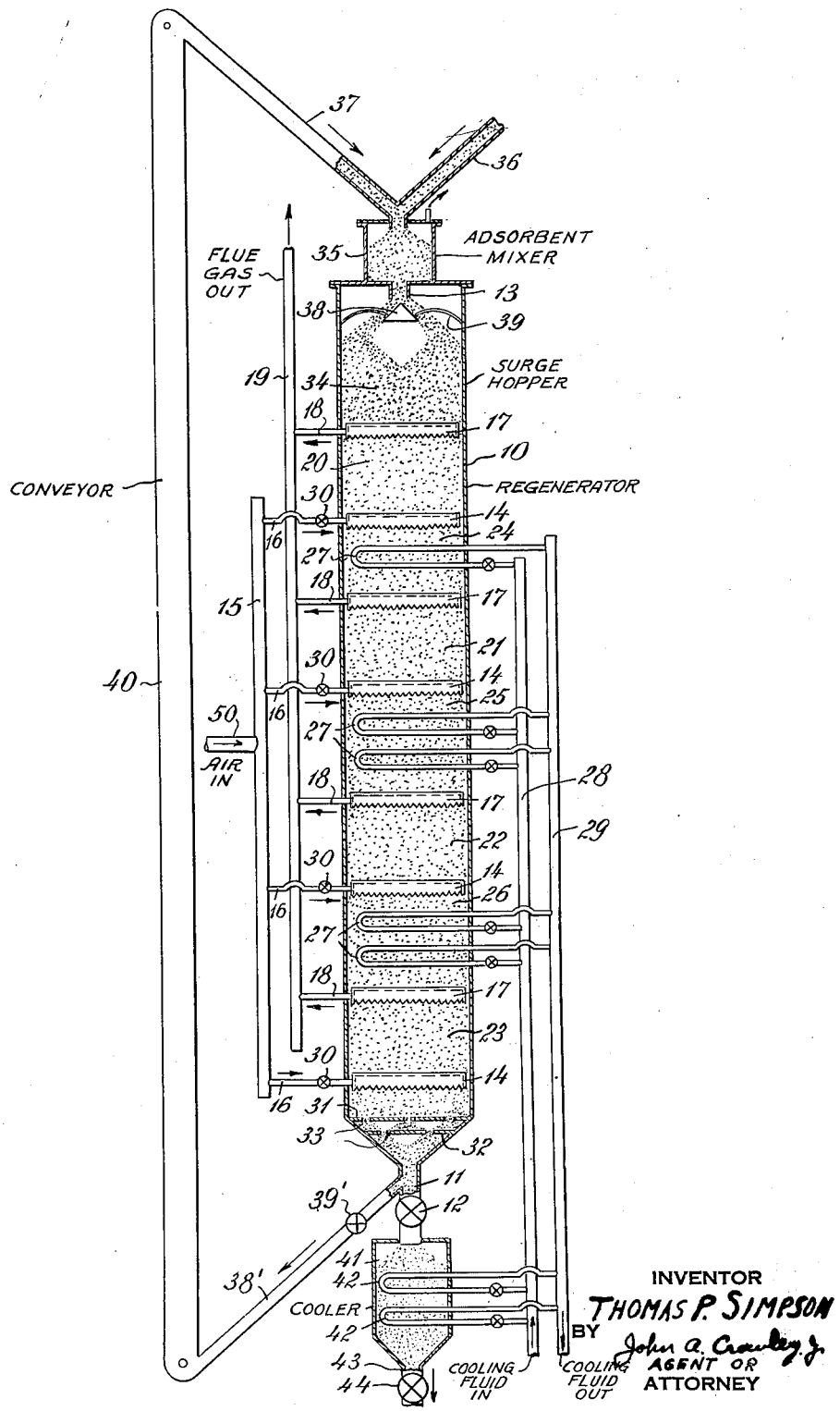

Patented May 2, 1950

2,506,552

UNITED STATES PATENT OFFICE 2,506,552

METHOD OF REGENERATING SPENT CONTACT MASS MATERIAL

Thomas P. Simpson, Woodbury, N. J., assignor to Socony-Vacuum Oil Company, Incorporated, a corporation of New York Application November 27, 1945, Serial No. 631,149

7 Claims. (Cl. 252—418)

This invention relates to the regeneration of particle-form solid adsorbent materials which have been used in processes tending to exhaust the utility of the adsorbent by the deposition thereon of relatively heavy deposits of carbonaceous contaminants. Exemplary of such materials are petroleum filter adsorbents such as natural clay, treated clay, bauxite, alumina and various synthetic associations of alumina, silica or silica and alumina which may contain small quantities of additional materials such as metallic oxides added for special purposes. Such adsorbent materials may vary in particle size from about 6 to 100 mesh. A preferred size range for petroleum percolation purposes lies between 30 to 60 mesh, as determined by a standard Tyler screen analysis. When such adsorbents are used by the percolation of petroleum oils for the purpose of removing gum forming compounds and color bodies, relatively large percentages of tarry and oily carbonaceous materials consisting principally of high molecular weight compounds of carbon and hydrogen are deposited on the adsorbent, thereby materially decreasing its effectiveness as a percolation medium.

This invention is specifically directed to an improved method for regeneration by burning of petroleum percolation adsorbents and the like which contain heavy deposits of carbonaceous contaminants and which exist at a temperature substantially below the lowest temperature practicable for initiation of the combustion of said contaminants. The regeneration of such adsorbents is complicated, first due to the fact that they must be preheated to a practicable contaminant ignition temperature, and during such preheating the contaminants on the more highly preheated portion of the adsorbent tend to distill and to deposit on the less highly preheated portion of the adsorbent. A second, and even more serious difficulty arises from the fact that a considerable amount of heat is released by the combustion reaction so that where very heavy contaminant deposits are involved the adsorbent may be heated during regeneration to such a temperature as will cause permanent deterioration in its efficiency for the process in which it is utilized. The temperatures which will cause such permanent heat damage vary with the type of adsorbent employed, being of the order of 1200° F. for natural and treated clay and of the order of about 1400° F. for most synthetic silica-alumina gel type adsorbents.

Heretofore such spent adsorbents have been regenerated by means of burning in rotary drum kilns or multiple hearth kilns. Such methods are objectionable since they fail to provide proper temperature control of the adsorbent during its regeneration. A greatly improved method and apparatus for adsorbent regeneration is described in the United States Patent No. 2,227,416 issued in 1940 to Payne. In the method set forth in that application the preheating of the spent adsorbent and the control of its temperature during the regeneration thereof was accomplished by passing a fluid heat exchange medium in indirect heat exchange relationship with the adsorbent in a preheating zone and throughout the regeneration zone. It has been more recently discovered that spent contact materials such as are involved in catalytic hydrocarbon conversion systems may be conveniently regenerated by passage of the spent catalyst as a substantially compact column through a series of alternating burning zones and cooling zones. Such a method is set forth in the copending patent application Serial No. 447,443 filed in the United States Patent Office June 17, 1942, now abandoned, of which the present applicant was one of the applicants.

Such a method has a number of advantages over single stage regeneration methods wherein a heat transfer medium is passed in heat transfer relationship with the spent adsorbent throughout the regeneration zone. In the first place it permits the maintenance of the adsorbent at a substantially higher average temperature during the contaminant burning, thereby giving rise to higher burning rates and reduction in required size of burning zones. It has the further advantage of permitting the use of much higher temperature differentials between the cooling medium and the adsorbent, thereby greatly decreasing the required amount of cooling surface. In general, a substantial simplification and reduction of the cost of the regeneration equipment and improvement in the regeneration operation is permitted by the use of the multistage alternate burning and cooling method.

While the use of this improved method has been found highly desirable for regeneration of contact mass materials such as are involved in most hydrocarbon conversion systems wherein the contact mass exists at a temperature which will support initiation of contaminant combustion, there are two difficulties involved in its use for regeneration of adsorbents containing very heavy contaminant deposits and existing at temperatures substantially below the lowest temperature practicable for initiation of contaminant combustion. In the first place there arises the problem of preheating the spent adsorbent charge to the alternate burning and cooling process. The number of cooling stages required for removal of the contaminant increases as the amount of deposit increases thereby increasing the construction cost and complicating the control of the equipment. In the second place, when the alternate burning and cooling method is employed for regeneration of adsorbents bearing more than certain definite amounts of carbon by weight of the spent adsorbent, the number of burning and cooling zones which are required for removal of the contaminant while controlling the adsorbent at proper temperature levels increases. With deposits amounting to more than about 4% carbon by weight of the usual adsorbent of about 0.25 specific heat, it is found that the cost of construction, the height of the apparatus, and the complication of operation control are so increased as to make the operation impracticable.

A major object of this invention is the provision of an improved practical and economical method for regeneration by burning of spent contact mass materials containing heavy contaminant deposits and existing at a temperature substantially below that lowest temperature practicable for initiation of combustion of said contaminants.

Another object of this invention is the provision of a method for regeneration of spent petroleum percolation adsorbents and the like, bearing contaminants containing greater than about 4% carbon by weight of the spent adsorbent and existing at temperatures substantially below the practicable combustion initiation temperature of said contaminants, which method permits the proper conditioning of the spent adsorbent for combustion and the burning off of said contaminants from said adsorbent under controlled temperature conditions and in the absence of substantial cooling surfaces in at least some of the burning zones.

These and other objects of this invention may be more readily understood from study of the attached single drawing which is a highly diagrammatic vertical view, partially in section, of an apparatus arrangement adapted for the method of this invention.

Before describing this drawing, however, several terms which are employed in describing and in claming this invention will be defined. The terms "gas" or "gaseous material" as used herein are intended in a sense sufficiently broad to include any material in the gaseous phase under the temperature and pressure conditions involved regardless of its normal phase at ordinary atmospheric conditions. The terms "temperature below that practicable for initiation of combustion regeneration" and "the lowest temperature practicable for initiating combustion regeneration" and the like are intended to mean the lowest temperature at which the particular contaminant deposited on the contact mass material will, upon contact with a combustion supporting gas, start to burn at a practicable initial burning rate such as will permit the initiation of burning in a commercial equipment of reasonable size. Such a minimum practicable initial burning rate in kilns of present design is of the order of about 0.1 to about 0.5 pound of carbon per hour per cubic foot of contact mass volume in the initial burning zone. It will be understood that the contaminant may also contain hydrogen and various other materials in lesser degree but it has been found that the amount of contaminant present and burned may be conveniently expressed on the basis of the carbon content of the contaminant as above. It will be further understood that once combustion is initiated, the contact material temperature will rise thereby permitting much higher burning rates for most of the regeneration period than the above specified practicable minimum. By the term "a temperature which would cause heat damage to the contact mass material" and like terms is meant a temperature which would cause permanent loss of the adsorbent or catalytic properties of the contact mass material so that its efficiency for the process in which it is used would be permanently materially decreased. By the term "spent" used in conjunction with the terms "adsorbent," "clay" or "contact mass material" is meant contact mass material etc. containing sufficient contaminant deposits to materially decrease its effectiveness for the process in which it is utilized. By the terms "hot contact mass material" and "hot adsorbent" is meant contact mass material which exists at a temperature substantially above that lowest temperature practicable for initiation of combustion of the contaminant on the spent contact material charged to the regenerator.

Turning now to the single drawing attached hereto we find a closed upright vessel 10 which may be of any practical cross sectional shape, which vessel is provided on its lower end with a solid discharge conduit 11 bearing a throttle valve 12 and upon its upper end with a solid inlet nozzle 13. Within the vessel 10 are provided a plurality of vertically spaced rows of horizontally extending gas distributing members 14 supplied from a gas inlet manifold 15 through pipes 16, which pipes contain flow control valves 30. Also provided within the vessel 10 are a plurality of rows of gas collector members 17 connected into outlet pipes 18 which in turn connect into a gas outlet manifold 19. The arrangement is such as to provide a plurality of vertically spaced apart burning zones 20, 21, 22 and 23, each provided with individual gas inlet and outlet means. It will be understood that the arrangement shown is highly diagrammatic and a number of modified structural arrangements for separate supply of gas to and withdrawal of gas from each burning zone may be used within the scope of this invention. In the vertically spaced zones 24, 25 and 26, which are provided intermediate the burning zones, are positioned cooling coils or tubes 27 which may be of any of a number of standard types of heat transfer devices. The tubes 27 connect on one end to an inlet manifold 28 and on their other ends to a common outlet manifold 29, so as to permit supply and withdrawal of a heat exchange fluid to and from the tubes 27. The heat exchange fluid may comprise any of a number of mediums commonly used for such purposes such as high pressure steam or water, low melting point lead alloys or fused inorganic salts which may be circulated from the outlet manifold 29 to a heat extraction system (not shown) and then returned to the cooling coils by way of inlet manifold 28. Provided near the bottom of the vessel 10 are partitions 31 and 32 containing properly spaced orifices 33 therein to insure substantially uniform downward flow of the solid material across the entire regenerator cross sectional area thereabove. Provided within the upper section of the vessel 10 is a zone 34 acting as a solid surge hopper which insures uniform and constant supply of solid material to the uppermost burning zone. On top of the vessel 10 and in solid communication therewith through nozzle 13 is a mixing chamber 35 to permit mixing of the two streams of adsorbent supplied thereto from conduits 36 and 37. A baffle 38 of inverted conical shape is supported by rods 39 directly below the nozzle 13 to cause further mixing and distribution of the adsorbent stream supplied to the surge hopper 34. Connecting into the regenerated adsorbent discharge conduit 11 is a conduit 38' having flow control valve 39' thereon for passage of a controlled amount of hot regenerated adsorbent to a conveyor 40. The conveyor 40 may be any of a number of types of conveyors properly adapted for transfer of hot particle-form solids, for example, a continuous bucket elevator. Solid is discharged from the upper end of conveyor 40 through conduit 37 for mixing with spent adsorbent supplied to the adsorbent mixer 35 through conduit 36. Below the vessel 10 is positioned a cooler 41 for cooling that portion of the regenerated adsorbent which is not recycled by conveyor 40. Cooling tubes 42 are provided within the cooler 41 and a discharge conduit 43 carrying throttle valve 44 is provided at the lower end of the cooler.

The regeneration of a spent petroleum percolation adsorbent existing at about 100° F. and bearing a carbonaceous deposit containing substantially more than about 4% carbon by weight of the spent adsorbent may be considered as a typical application of method of this invention as carried out in the above-described apparatus. The spent adsorbent is continuously supplied through conduit 36 to mixer 35 wherein it mixes with hot regenerated adsorbent withdrawn from the bottom of the regenerator and supplied to mixer 35 by means of conveyor 40 and conduit 37. The ratio of the hot regenerated to spent adsorbent is so controlled that the carbon content of the mixture is below about 4% carbon by weight and further so that the temperature of the mixture is at least equal to the lowest temperature practicable for initiation of the contaminant combustion. This temperature may be of the order of about 700° F. and upwards. The mixed adsorbent then passes into surge hopper 34 and then as a substantially compact column of downwardly moving particles through the series of alternating burning and cooling zones.

Regenerated adsorbent is discharged through conduit 11, part passing through conduit 38' for recycle and part passing through valve 12 into cooler 41 wherein it is cooled to any desired finished temperature. Cooled regenerated adsorbent is withdrawn through conduit 43 to storage or to the petroleum percolation process. Combustion supporting gas such as air or flue gas containing controlled percentages of oxygen pass from a compressor or blower (not shown) through inlet duct 50 to manifold 15 from which it is drawn at the desired rates to the several burning zones through conduits 16 and gas distributing members 14. The combustion supporting gas may or may not be preheated before its introduction into the burning zones depending upon the requirements of the particular operation involved. Spent regeneration gas is withdrawn from collecting members 17, and thence through outlet conduits 18 to gas outlet manifold 19. The manifold 19 may not be connected to a suitable dust separator (not shown) for recovery of entrained fines if desired.

The temperature of the adsorbent during its passage through the regenerator is controlled below a level which would cause heat damage to the adsorbent and above a level below which the contaminant combustion rate would be impractically low. This is accomplished by permitting the temperature of the adsorbent to rise in each burning zone due to the heat released by combustion and then by cooling the adsorbent in each cooling zone sufficiently to prevent the adsorbent temperature from rising to a damaging level in the subsequent burning zone. The temperature above which permanent heat damage to the adsorbent would result varies with the particular type of adsorbent involved. For natural and treated clays, such as fuller's earth and the like, the adsorbent temperature should be limited below about 1200° F. For silica-alumina gel type adsorbents the critical temperature is of the order of 1400° F. The lower temperature limits, i. e., that below which practicable burning rates would not be obtained, vary depending upon the contaminant initially involved and upon the stage of its removal. In general, it has been found undesirable to cool the adsorbent below about 900° F. in the earlier part of the regeneration and below about 1000° F. in the later part thereof when burning carbonaceous contaminants of the type resulting from petroleum percolation and catalytic hydrocarbon conversion or treating processes.

The amount of contaminant burned from the adsorbent in each burning zone varies with the permissible adsorbent temperature rise in that zone and upon the chemical nature of the adsorbent involved. It has been found in general that the amount of burning per zone below the first zone should range between about 0.1 to 0.6% carbon by weight of the total adsorbent throughput. The adsorbent residence time per burning zone to permit this amount of contaminant combustion varies from about 2 to 15 minutes per zone. It has been found that when the adsorbent bears a contaminant containing more than about 4% carbon by weight, the number of zones required to regenerate the adsorbent, that is to reduce the carbon content to about 0.1 to 0.5% by weight of the adsorbent becomes so high as to render this type of method impractical from a construction and economic standpoint. However, when spent adsorbents bearing very high percentages of contaminant deposit are diluted with hot regenerated adsorbent to reduce the average carbon content to less than about 4% by weight, such adsorbents may then be very conveniently regenerated by the highly desirable and economical alternate burning and cooling method. For example, assume that a petroleum percolation adsorbent bearing a contaminant containing about 8% carbon by weight of the spent adsorbent and existing at about 100° F. is to be regenerated by the method of this invention so as to provide a regenerated adsorbent containing an allowable carbon percentage of 0.5% by weight. Assume further that the spent adsorbent is mixed with twice its volume of hot regenerated adsorbent existing at about 1150° F. The resulting mixture will contain 3% carbon by weight and the resulting mixed charge temperature will be about 800° F. which is sufficient to permit initiation of the contaminant combustion at a practical rate. Assume further that the nature of the contaminant as determined by routine experiment is such as to permit a removal of about 0.3% carbon on the average per burning zone below the first burning zone wherein combustion is initiated and wherein about 0.1% carbon by weight is removed. By calculation it will follow that the total number of burning zones required will be about 9. This is within the practical commercial range for number of burning zones and will permit accomplishment of the regeneration of this adsorbent in a commercial regenerator of practical diameter and height. It will be apparent that if the ratio of hot regenerated to spent adsorbent is still further increased the required number of zones for regeneration of the adsorbent will decrease. It should be understood that while the average carbon removal per zone in the above example was taken at 0.3% by weight of the total adsorbent throughput, the amount of carbon removal in the several zones may vary, being as high as about 0.6% by weight in some of the intermediate zones and as low as 0.1% by weight in some of the later zones wherein the burning rate is lower due partially to decreased hydrogen content in the residual carbonaceous contaminant. From this it will be apparent that the cooling load may vary in the different cooling zones along the regenerator length, and that in some operations cooling between some of the burning zones may be unnecessary.

The lowest temperature practicable for initiation of combustion of carbonaceous contaminants will vary somewhat depending principally on the carbon to hydrogen ratio of the contaminant. The temperature required to provide a burning rate of 0.1% carbon by weight of the adsorbent may be easily determined by known routine experimental methods for any given contaminant. In general, for carbonaceous contaminants such as occur on petroleum percolation adsorbents and the like, the lowest temperature practicable for combustion initiation has been found to be of the order of about 700° F.

While the process specifically described hereinabove involves the regeneration of spent contact material by passing it through a series of alternating burning zones wherein the contaminant is burned in the absence of cooling and cooling zones wherein the contact material is cooled in the absence of burning, it should be understood that the method of this invention is also applicable to a process wherein the spent contact material is passed through a series of alternating burning zones wherein contaminant is burned in the absence of cooling and cooling zones wherein the contact material is cooled while at the same time contaminant is being burned. It should be understood that the step of cooling the contact material in zones intermediate the burning zones as set forth in the claims is intended, unless otherwise specifically specified, broadly to cover cooling in the presence and cooling in the absence of burning. When the operation involves the step of cooling in the presence of burning the amount of burning accomplished in the cooling stage depends upon volumetric size of the cooling stage and the rate of combustion supporting gas throughput. In general, the amount of burning in such cooling zones is about 0.2 to 4 pounds carbon per hour per cubic foot of catalyst volume in the cooling zone. The operation of the burning zones in such a process is substantially the same as when no contaminant burning occurs in the cooling zones.

It will be seen from the above discussion that the recycling of hot substantially regenerated adsorbent according to the method of this invention accomplishes two important functions. First, it permits the dilution of the contaminant content of the spent adsorbent to a level permitting its regeneration by the highly efficient multistage alternate burning and cooling method. Second, it accomplishes very rapid preheating of the cold, spent adsorbent to a practicable combustion initiation temperature without the requirement for complicated heat exchangers and outside heat supply, and without waste of any of the regenerator burning zone volume.

It should be understood that the specific operation conditions, equipment structure and applications of the method of this invention as set forth hereinabove are intended as exemplary and are in no way to be construed as limiting the scope of this invention except as it is limited in the following claims.

I claim:
1. The method of regenerating spent petroleum percolation inorganic adsorbents containing heavy deposits of carbonaceous contaminants in which the carbon content is more than about 4% by weight of the adsorbent and being at a temperature substantially below the lowest temperature practicable for initiation of combustion of said contaminants which method comprises: mixing with said spent adsorbent a quantity of hot substantially regenerated adsorbent which is at a temperature substantially above the lowest temperature required for practicable combustion of said contaminants, said quantity being sufficient to heat said spent adsorbent to a temperature at least above the lowest temperature practicable for initiation of the combustion of said contaminants and sufficient to provide an adsorbent mixture in which the carbon content of the contaminants is less than about 4 per cent by weight of the adsorbent, passing said mixture through a series of superposed burning zones wherein it passes as a substantially compact column of downwardly moving particles and wherein it is maintained at contaminant combustion temperatures, passing combustion supporting gas into contact with said adsorbent in each of said burning zones to burn off said contaminants and cooling said adsorbent in zones intermediate at least most of said burning zones so as to limit the maximum temperature of said adsorbent below that which would cause heat damage to said adsorbent.

2. In a process for regenerating spent inorganic contact mass materials containing heavy deposits of carbonaceous deposits and being substantially below the practicable combustion initiation temperature of said deposits by burning off said contaminants with a combustion supporting gas in a series of successive burning zones maintained at contaminant combustion temperatures in between which said contact mass is cooled to prevent its rise to heat damaging temperatures and in which zones said contact mass moves as a substantially compact column the improvement which comprises: mixing with said spent contact mass which bears a deposit in which the carbon content is greater than about 4% by weight of the adsorbent prior to the burning of said carbonaceous deposit a quantity of hot substantially regenerated contact mass material which is at a temperature substanitally above the lowest temperature practicable for initiation of the combustion of said deposit, which quantity is sufficient to dilute the carbonaceous deposit to less than about 4 per cent by weight carbon content on the mixed contact mass material and sufficient to heat said spent adsorbent to a temperature at least equal to that lowest temperature practicable for initiation of the combustion of said carbonaceous deposit.

3. The method of regenerating spent inorganic petroleum percolation adsorbents containing heavy deposits of carbonaceous contaminants and being at a temperature substantially below the lowest temperature practicable for initiation of combustion of said contaminants which method comprises: mixing the spent adsorbent which is at a temperature level of approximately 100° F. and bearing contaminants in which the carbon content amounts to more than about 4 per cent by weight of the adsorbent a quantity of hot substantially regenerated adsorbent which is at a temperature substantially above the lowest temperature required for practicable combustion of said contaminants, said quantity being sufficient to heat said spent adsorbent to a temperature at least above the lowest temperature practicable for initiation of the combustion of said contaminants and sufficient to provide an adsorbent mixture in which the carbon content of the contaminants is less than about 4 per cent by weight of the adsorbent, passing said mixture through a series of superposed burning zones wherein it passes at contaminant combustion temperatures as a substantially compact column of downwardly moving particles, passing combustion supporting gas into contact with said adsorbent in each of said zones to burn off said contaminants and cooling said adsorbent in zones intermediate at least most of said burning zones so as to limit the maximum temperature of said adsorbent below that which would cause heat damage to said adsorbent, withdrawing regenerated adsorbent from the last of said burning zones at a temperature substantially above the lowest temperature practicable for initiation of the combustion of the contaminant on said spent adsorbent, and using a portion of said regenerated adsorbent as said hot substantially regenerated adsorbent mixed with said spent adsorbent prior to its passage through said burning zones.

4. The method of regenerating spent particle-form inorganic contact mass materials containing carbonaceous deposits having a carbon content substantially greater than about 4 per cent by weight of the contact mass material and being at a temperature insufficient for initiation of contaminant combustion at a practicable rate which is below about 700° F. which method comprises: mixing said spent contact mass material with a quantity of hot substantially regenerated contact mass material sufficient to heat said spent contact mass material to a practicable contaminant ignition temperature of at least about 700° F. and sufficient to provide a mixed contact mass material having a contaminant carbon content less than about 4 per cent by weight of the mixed contact mass material, said hot regenerated contact material being at a temperature substantially in excess of 700° F. prior to the mixing, passing said mixed contact mass material through a series of superposed burning zones wherein it passes as a substantially compact column of downwardly moving particles at suitable temperatures for the contaminant combustion, passing oxygen containing gas in controlled amounts in contact with said contact mass material in each of said burning zones, passing a cooling fluid into heat exchange relationship with said contact mass material in the absence of oxygen containing gas in zones intermediate most of said burning zones to limit the maximum temperature of said contact mass material below about 1200° F. and withdrawing substantially regenerated hot contact mass material from the lowermost of said burning zones.

5. The method according to claim 4 further characterized by the step of recycling a portion of said hot regenerated contact mass material without substantial cooling thereof to a mixing zone for mixing with said spent contact mass material before its passage through said series of burning zones.

6. The method of regenerating spent inorganic particles of petroleum percolation adsorbent containing carbonaceous contaminants containing substantially greater than 4 per cent of carbon by weight of the adsorbent and being at a temperature below about 700° F. which method comprises: mixing said spent contact mass material bearing contaminants in which the carbon content is substantially greater than 4% by weight of the adsorbent with a quantity of hot substantially regenerated contact mass material sufficient to heat said spent contact mass material from a temperature insufficient for combustion of the contaminant at a practicable rate, which temperature is below about 700° F. to a contaminant combustion temperature of at least about 700° F. and sufficient to provide a mixed contact mass material having a contaminant carbon content of less than about 4 per cent by weight of the mixed contact mass material, maintaining an elongated substantially compact, upright column of said adsorbent, replenishing said column at its upper end with said mixed adsorbent, withdrawing substantially regenerated, hot adsorbent from the lower section of said column, passing oxygen containing gas through said column in a plurality of vertically spaced separate burning zones along said column to burn off from said adsorbent of the order of 0.1 to 0.6 per cent by weight carbon based on the total adsorbent throughput within each of said burning zones, passing a cooling fluid in heat exchange relationship with said adsorbent in the absence of oxygen containing gas in a plurality of spaced cooling zones located intermediate at least most of said burning zones to cool said adsorbent within each of said cooling zones substantially only so much as is required to limit the adsorbent temperature below about 1200° F. in the subsequent burning zone without cooling the adsorbent below 700° F. and utilizing a portion of said hot regenerated adsorbent from the lower section of said column which exists at a temperature substantially above 700° F. for mixing with said spent adsorbent.

7. The method of regenerating spent particle-form inorganic contact mass materials containing carbonaceous deposits having a carbon content substantially greater than about 4 per cent by weight of the contact mass material and being at a temperature insufficient for initiating contaminant combustion which is below about 700° F. which method comprises: mixing said spent contact mass material with a quantity of hot substantially regenerated contact mass material sufficient to heat said spent contact mass material to a contaminant ignition temperature of at least about 700° F. and sufficient to provide a mixed contact mass material having a contaminant carbon content less than about 4 per cent by weight of the mixed contact mass material, said hot regenerated material being at a temperature substantially above 700° F. prior to the mixing, passing said mixed contact mass material through a series of superposed burning zones wherein it passes as a substantially compact column of downwardly moving particles at temperatures suitable for the contaminant combustion, passing oxygen containing gas in controlled amounts in contact with said contact mass material in each of said burning zones, passing a cooling fluid in indirect heat relationship with said contact material in zones intermediate most of said burning zones to limit the maximum temperature of said contact mass material below about 1200° F. and withdrawing substantially regenerated hot contact mass material from the lowermost of said burning zones.

THOMAS P. SIMPSON.

REFERENCES CITED

The following references are of record in the file of this patent:

UNITED STATES PATENTS

| Number | Name | Date |
|---|---|---|
| 1,598,967 | Hiller | Sept. 7, 1926 |
| 2,226,535 | Payne | Dec. 31, 1940 |
| 2,344,449 | Ogorzaly | Mar. 14, 1944 |
| 2,387,936 | Nicholls et al. | Oct. 30, 1945 |
| 2,409,234 | Arveson | Oct. 15, 1946 |
| 2,409,596 | Simpson et al. | Oct. 15, 1946 |
| 2,412,917 | Simpson et al. | Dec. 17, 1946 |
| 2,417,275 | Thompson et al. | Mar. 11, 1947 |

Certificate of Correction

May 2, 1950

Patent No. 2,506,552

THOMAS P. SIMPSON

It is hereby certified that errors appear in the printed specification of the above numbered patent requiring correction as follows:

Column 3, line 51, for "claming" read *claiming*; column 5, line 70, for the words "may not be" read *may be*; and that the said Letters Patent should be read with these corrections therein that the same may conform to the record of the case in the Patent Office.

Signed and sealed this 22nd day of August, A. D. 1950.

[SEAL]

THOMAS F. MURPHY,
*Assistant Commissioner of Patents.*